United States Patent [19]

Nagashima

[11] Patent Number: 4,793,303

[45] Date of Patent: Dec. 27, 1988

[54] ELBOW FOR CARBURETTOR

[75] Inventor: Akira Nagashima, Kawasaki, Japan

[73] Assignee: Kioritz Corporation, Tokyo, Japan

[21] Appl. No.: 13,920

[22] Filed: Feb. 12, 1987

[30] Foreign Application Priority Data

Feb. 25, 1986 [JP] Japan ............................ 61-25187[U]

[51] Int. Cl.[4] ............................................ F16L 11/12

[52] U.S. Cl. ............................... 123/198 E; 138/109; 285/179

[58] Field of Search ............. 55/DIG. 28; 123/198 R, 123/198 E; 138/103, 109, 118, DIG. 8; 285/179, 910

[56] References Cited

U.S. PATENT DOCUMENTS 1,834,581 12/1931 Ferrel et al. .................... 285/910 X
2,503,934 4/1950 Church ........................... 285/179 X
2,671,521 3/1954 Klemm et al. ................. 285/179 X
4,446,822 5/1984 Inaga et al. ........................ 123/41.3
4,450,933 5/1984 Fukuoka et al. .................... 181/229
4,594,083 6/1986 Hiraizumi ......................... 55/385 R

FOREIGN PATENT DOCUMENTS 3137664 6/1982 Fed. Rep. of Germany .

*Primary Examiner*—Mark J. Thronson
*Attorney, Agent, or Firm*—Browdy and Neimark

[57] ABSTRACT

An elbow for a carburettor for defining an air passageway between an air cleaner and a carburettor for supplying clean air from the air cleaner to the carburettor which feeds air-fuel mixture to an internal combustion engine. The elbow is formed of resilient material and has a flange portion formed integrally at end portion thereof.

2 Claims, 2 Drawing Sheets

FIG. I

ELBOW FOR CARBURETTOR

BACKGROUND OF THE INVENTION

This invention relates to an elbow for a carburettor suitable for use in defining an air passageway between the carburettor for feeding an air-fuel mixture to an internal combustion engine and an air cleaner for supplying clean air to the carburettor, and more particularly it is concerned with an elbow for a carburettor which lends itself to use with various portable machines each performing a different operation, such as a chain saw.

In this type of machine, it is necessary that various parts be housed in a narrow open space. It has been usual practice in these machines to use an elbow for a carburettor to connect the carburettor with an air cleaner. The elbow has usually been formed of metal or hard synthetic resinous material and secured at opposite ends thereof to the carburettor and air cleaner through seal members formed as of rubber for airtightly sealing the connections. One of the problems encountered in this type of elbow has been that the method used for forming the elbow has frequently caused the air passageway defined thereby to make sharp corners. This has resulted in adversely affecting the efficiency of the engine and has increased the number of parts, such as seal members, making it difficult to obtain a compact overall size and a light weight in a machine of the type described and to reduce its price.

SUMMARY OF THE INVENTION

This invention has as its object the provision of an elbow for a carburettor which is simple in construction and easy to manufacture and assemble to thereby obviate the aforesaid problem of the prior art.

The outstanding characteristic of the invention enabling the aforesaid object to be accomplished is that the elbow for a carburettor according to the invention is formed of resilient material in a unitary structure and has a flange at an end portion thereof.

The elbow for the carburettor according to the invention defines an air passageway which smoothly curves and can be readily connected directly to the carburettor and air cleaner by providing an airtight seal. Since the elbow according to the invention is formed of resilient material, it is possible to remove the formed elbow from the die while causing same to undergo elastic deformation by utilizing the resilience of the material. This makes it possible to use a die from which a formed elbow cannot be removed when metal or hard synthetic resinous material is cast, and to form the elbow with a smoothly curved inner surface. The elbow according to the invention which eliminates the need to provide a separate seal member between it and the air cleaner is simple in construction and easy to produce and assemble. Air-fuel mixture flows smoothly through the elbow, enabling the power of the engine to be increased.

DESCRIPTION OF THE PREFERRED EMBODIMENT

A preferred embodiment of the elbow in conformity with the invention will now be described by referring to the accompanying drawings.

Figure 1:
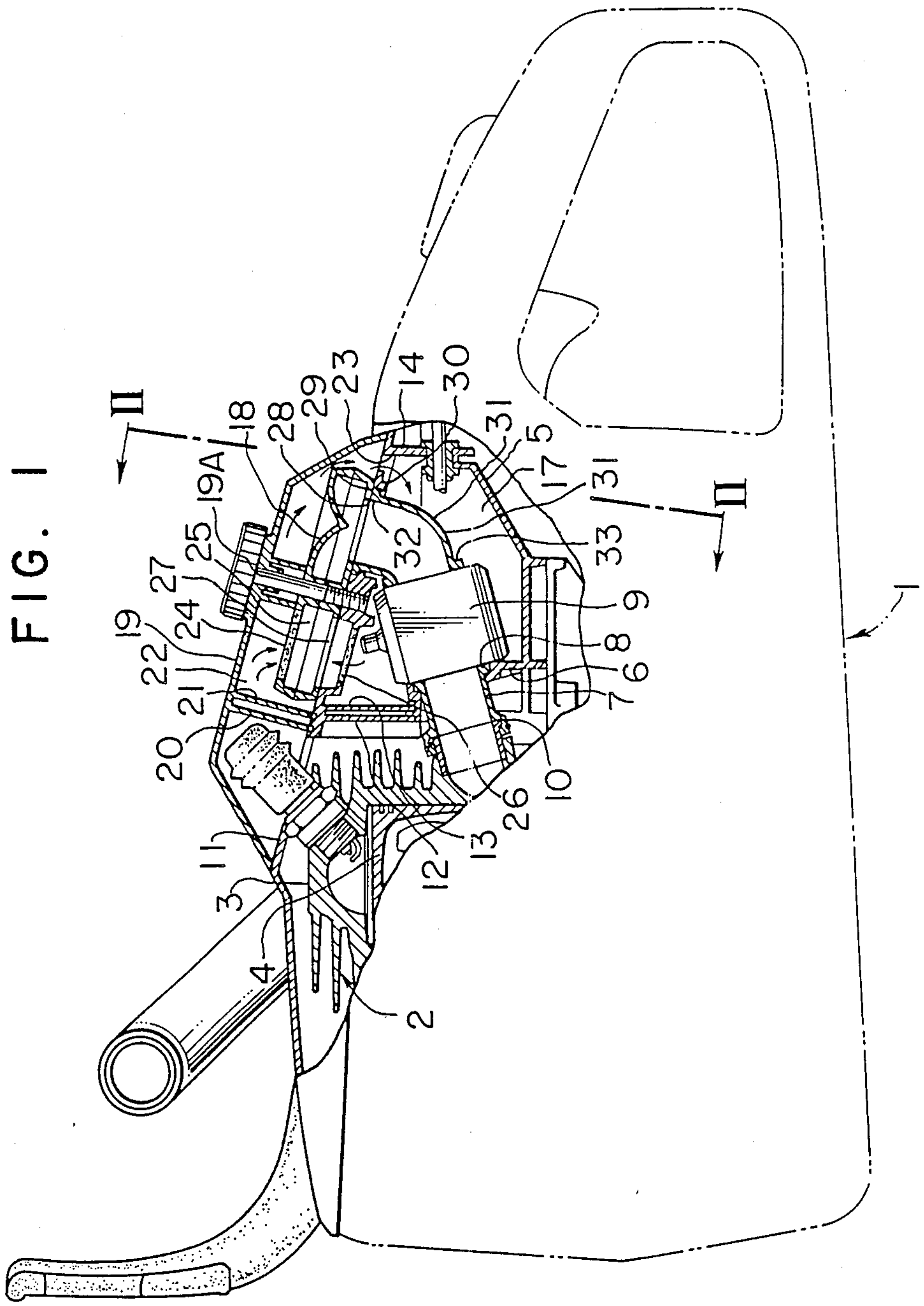
FIG. 1 is a fragmentary sectional view of a chain saw incorporating therein one embodiment of the invention.
Figure 2:
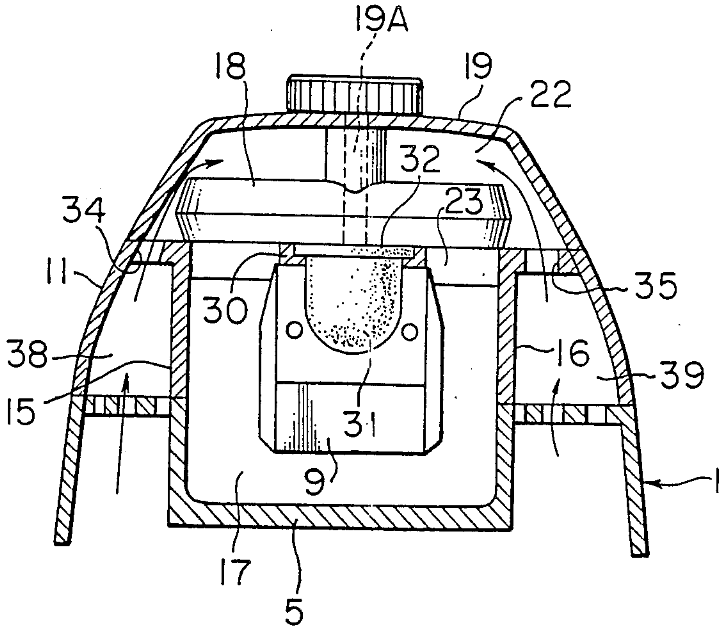
FIG. 2 is a view, on an enlarged scale, as seen in the direction of arrows II—II in FIG. 1.

Referring to FIGS. 1 and 2, there is shown a body 1 of a chain saw in which the embodiment of the invention is incorporated. An internal combustion engine 2 is mounted in the body 1 and includes a cylinder 3 in which a piston 4 moves vertically in reciprocatory movement.

A carburettor case 5 is located in the body 1 in a position in which it is disposed adjacent a rear end portion of the cylinder 3, and has a front wall portion 6 which is upright. A suction pipe 7 has one end portion 8 which is fitted to the upright front wall portion 6 and held between it and a carburettor 9 housed in the carburettor case 5, and an opposite end portion 10 which is connected to the cylinder 3 to feed air-fuel mixture from the carburettor 9 to the internal combustion engine 2. The carburettor 9 is firmly held in position by a bolt, not shown, extending through opposite end portions thereof and threadably fitted to the front wall portion 6 of the carburettor case 5.

Upper portions of the cylinder 3 and carburettor 9 are enclosed by a cylinder cover 11 secured to the body 1 of the chain saw. The cylinder cover 11 which is formed of synthetic resinous material has double wall portions 12 and 13 formed integrally therewith, which extend downwardly between the cylinder 3 and carburettor 9. The double wall portions 12 and 13 engage at their lower ends the front wall portion 6 of the carburettor case 5 to define an open space between the cylinder 3 and carburettor 9 so as to insulate heat. Moreover, the cylinder cover 11 has formed integrally therewith a rear wall portion 14 which extends downwardly from a rear portion thereof and abuts against the carburettor case 5, and side wall portions 15 and 16 (see FIG. 2) which extend downwardly from opposite side portions thereof and abut against the carburettor case 5. Thus the carburettor case 5 and cylinder cover 11 define therebetween an open space 17 enclosing the carburettor 9.

An air cleaner 18 located on a top wall portion of the cylinder cover 11 above an upper portion of the open space 17 is in the form of a box and houses therein filter members 24 and 27. The box-shaped air cleaner 18 is held between the cylinder cover 11 and a cleaner cover 19 formed of synthetic resinous material which is detachably attached to the air cleaner 18 and secured in place by a screw 19A extending through the cleaner cover 19 and air cleaner 18 and threadably engaging the top wall portion of the cylinder cover 11. The cleaner cover 19 has formed integrally therewith double wall portions 20 and 21 which extend downwardly from a portion of the cleaner cover 19 close to the cylinder 3 to removably engage the cylinder cover 11 to define an open space 22 in the cleaner cover 19. The double wall portions 12 and 13 of the cylinder cover 11 and the double wall portions 20 and 21 of the cleaner cover 19 perform the function of separating the carburettor 9 and air cleaner 18 from the cylinder 3 of the internal combustion engine 2 to protect the carburettor 9 and air cleaner 18 by insulating heat and to shut off noise from the cylinder 3.

Figure 3:
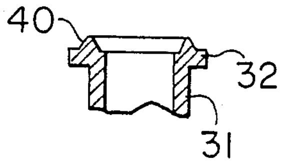
FIG. 3 is a sectional view of a flange portion of the elbow according to the invention.

The open space 22 in the cleaner cover 19 is maintained in communication with the carburettor case 5 and the open space 17 in the cylinder cover 11 through an opening 23 formed in a rear portion of the top wall portion of the cylinder cover 11. Moreover, the open space 22 in the cleaner cover 19 is maintained in communication with an internal space 25 of the air cleaner 18 through the filter member 24 constituting a top layer of the air cleaner 18, and the open space 17 in the cylinder cover 11 is maintained in communication with the internal space 25 of the air cleaner 18 through an opening 26 formed in a front portion of the top wall portion of the cylinder cover 11 and through the filter member 27 constituting the lower layer of the air cleaner 18. The air cleaner 18 is formed at a bottom surface thereof with a clean air outlet port 28 which is disposed in alignment with an elbow fitting port 29 formed at the top wall portion of the cylinder cover 11 which has formed integrally therewith a recessed annular seat portion 30 disposed in the vicinity of a top surface of the fitting port 29. An elbow 31 formed of resilient material, such as rubber, is inserted from below into the elbow fitting port 29 at the cylinder cover 11 in such a manner that a flange portion 32 at an upper end of the elbow 31 is seated at the recessed annular seat portion 30 at the cylinder cover 11. The upper flange portion 32 has an annular lip portion 40 (see FIG. 3) formed integrally at a top surface thereof and extending upwardly into engagement with a peripheral portion of the clean air outlet port 28 of the air cleaner 18. The annular lip portion 40 is brought into pressing engagement with the peripheral portion of the clean air outlet port 28 of the air cleaner 18 to hermetically seal the connection between the air cleaner 18 and elbow 31. The elbow 31 has a lower flange portion 33 which is firmly secured to an air inlet port of the carburettor 9. Being formed of an elastomeric resilient material, such as rubber, the elbow 31 can be removed from a die by causing same to undergo elastic deformation by virtue of the elasticity of the material, when it is removed from the die after being cast. This makes it possible to use a die of a shape from which it is impossible to remove an elbow formed of metal or hard synthetic resinous material. This enables a desired shape to be given to the elbow 31 so that the elbow 31 can have a smoothly curving intermediate portion, for example. By virtue of the aforesaid construction, the elbow 31 can be hermetically sealed without the need to use additional seal members, and air flows smoothly from the air cleaner 18 to the carburettor 9 through the elbow 31. The shape of the elbow 31 enables air to be effectively prevented from being blown back, thereby increasing the power of the internal combustion engine 2.

Referring to FIG. 2, the cylinder cover 11 is formed at opposite sides thereof with apertures 34 and 35, and the open space 22 in the cleaner cover 19 is maintained in communication with a side space 38 defined between the cylinder cover 11 and side wall portion 15 through the apertures 34 and with another side space 39 defined between the cylinder cover 11 and side wall portion 16 through the apertures 35. The side spaces 38 and 39 are open at their lower ends at opposite sides of the carburettor case 5 and communicated with the atmosphere outside the body 1 of the chain saw.

In operation, air flows in currents from outside into the body 1 of the chain saw from its lower portion toward its upper portion and enters the side spaces 38 and 39 while allowing relatively large masses of dust to fall. Then the air currents flow through the apertures 34 and 35 into the open space 22 in the cleaner cover 19. Part of the air introduced into the open space 22 flows through the filter member 2 constituting the upper layer of the air cleaner 18 into the internal space 25 while the rest of the air flows through the opening 23 formed in the rear portion of the top wall portion of the cylinder cover 11 into the open space 17 surrounding the carburettor 9, from which the air flows through the opening 26 formed in the front portion of the top wall portion of the cylinder cover 11 and the filter member 27 constituting the lower layer of the air cleaner 18 into the internal space 25 of the air cleaner 18. These air currents perform the function of keeping the temperature of the carburettor 9 and parts in its vicinity at a suitable level. The air thus cleaned by the air cleaner 18 flows from the internal space 25 through the clean air outlet port 28 into the elbow 31. The air flowing through the elbow 31 has the direction of its flow altered by flowing through an air passageway of predetermined shape, to be smoothly introduced into the carburettor 9.

What is claimed is:

1. An elbow in combination with an air cleaner and a carburettor for defining an air passageway therebetween comprising
   - a carburettor for feeding an air-fuel mixture to an internal combustion engine and having an air inlet port;
   - an air clear for supplying clean air to said carburettor and having an air outlet port;
   - an elbow connected at one end to said air outlet port of said air cleaner and at its other end to said air inlet port of said carburettor;
   - said elbow formed of an elastomeric resilient material capable of undergoing elastic deformation and having an upper flange at said one end and a lower flange at said other end;
   - said upper flange having an annular lip portion formed integrally with said elbow at a top surface of said upper flange;
   - said annular lip portion of said upper flange held in pressing engagement with a peripheral portion of said air output port to form an hermetical seal between said elbow and said air cleaner.

2. An elbow in combination with an air cleaner and a carburettor for defining an air passageway therebetween comprising
   - a carburettor for feeding an air-fuel mixture to an internal combustion engine and having an air inlet port;
   - an air cleaner for supplying clean air to said carburettor and having an air outlet port;
   - an elbow connected at one end to said air outlet port of said air cleaner and at its other end to said air inlet port of said carburettor;
   - said elbow formed of an elastomeric resilient material capable of undergoing elastic deformation and having a flange on at least one end thereof;
   - said flange having an annular lip portion formed integrally with said elbow at a top surface of said flange;
   - said annular lip portion of said flange held in pressing engagement with a peripheral portion of one of said air ports to form an hermetical seal between said elbow and said air port.

* * * * *